United States Patent [19]

Klatt

[11] Patent Number: 4,510,906

[45] Date of Patent: Apr. 16, 1985

[54] ACCELERATOR PEDAL MECHANISM FOR OPTIMIZING FUEL ECONOMY

[75] Inventor: Alfred Klatt, Wathlingen, Fed. Rep. of Germany

[73] Assignee: WABCO Westinghouse Fahrzeugbremsen GmbH, Hanover, Fed. Rep. of Germany

[21] Appl. No.: 530,286

[22] Filed: Sep. 8, 1983

[30] Foreign Application Priority Data

Sep. 17, 1982 [DE] Fed. Rep. of Germany ....... 3234479

[51] Int. Cl.³ ............................................ F02D 31/00
[52] U.S. Cl. ..................................... 123/396; 123/401
[58] Field of Search ............... 123/342, 396, 340, 344, 123/360, 376, 401

[56] References Cited

U.S. PATENT DOCUMENTS 2,188,704  1/1940  Claytor ............................... 123/342
4,270,501  6/1981  Breen et al. ......................... 123/350

FOREIGN PATENT DOCUMENTS 1195087  6/1965  Fed. Rep. of Germany ...... 123/396

Primary Examiner—William A. Cuchlinski, Jr.
Attorney, Agent, or Firm—G. J. Falce

[57] ABSTRACT

An accelerator pedal control mechanism provides a positionable stop to resist pedal depression beyond a point at which optimum fuel economy is realized during vehicle acceleration. The position of the stop relative to the accelerator pedal is controlled by an electronic circuit that is programmed to select the desired point of accelerator depression for a given condition of engine operating parameters. A caged limit spring is carried on the underside of the accelerator pedal for engagement with the stop, thus allowing the operator to sense the additional resistance of the spring through the accelerator pedal when the appropriate amount of accelerator depression is reached. The spring allows the operator to override the programmed control by pressing on the accelerator pedal with sufficient force to overcome the limit spring.

6 Claims, 1 Drawing Figure

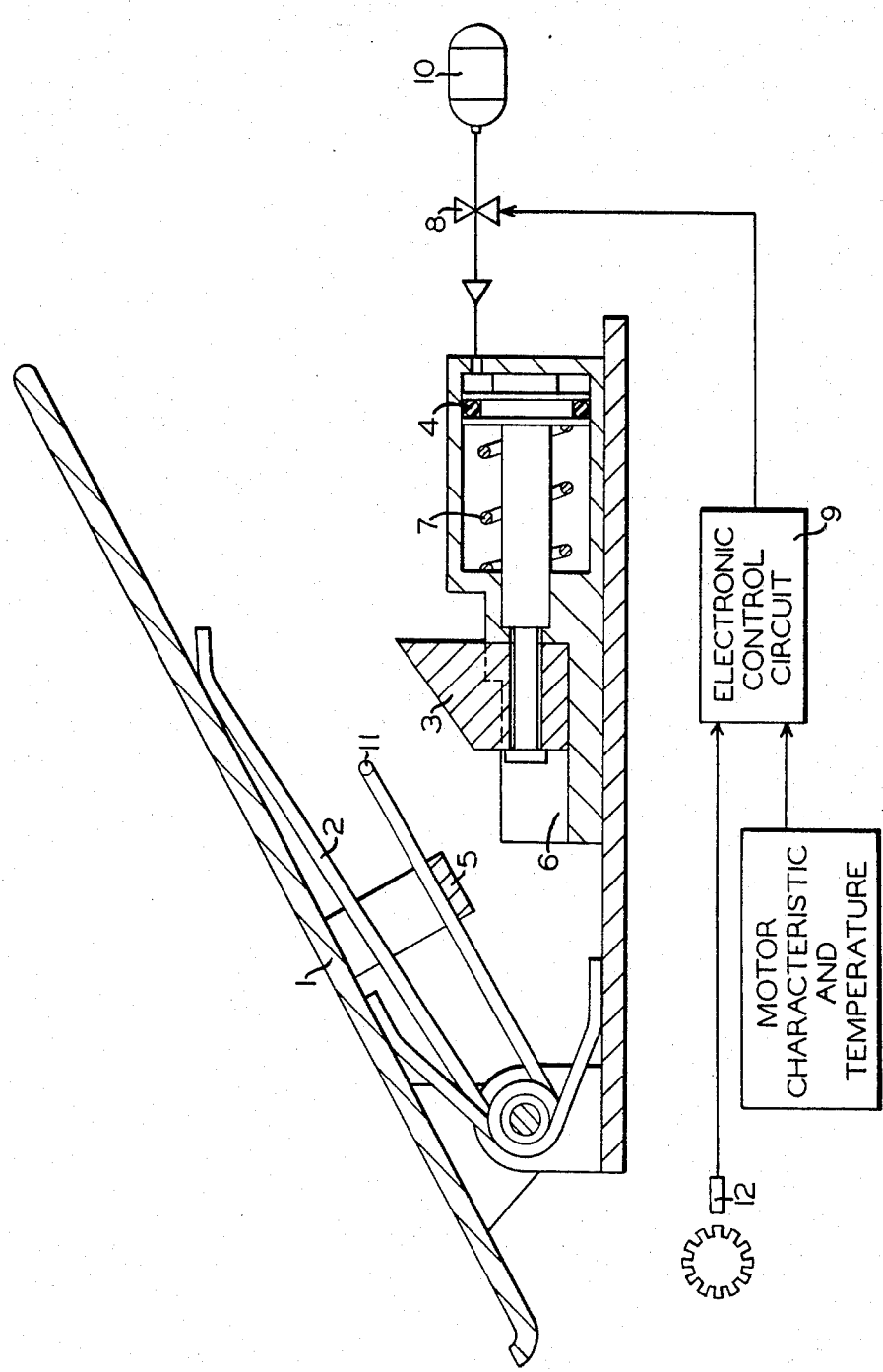

ACCELERATOR PEDAL MECHANISM FOR OPTIMIZING FUEL ECONOMY

BACKGROUND OF THE INVENTION

The present invention relates to an accelerator control mechanism for optimizing fuel economy on road vehicles and particularly on commercial-type road vehicles.

It is desirable in this era of high fuel costs to minimize fuel consumption. High fuel consumption had been attributed largely to poor driving habits, particularly during the acceleration phase. It has been found that the most efficient fuel consumption is realized when acceleration takes place in the highest possible gear, i.e., at low engine speed with nearly full throttle, until shifting into the next higher gear at the lowest possible engine speed. While such a manner of operation is only recommended for warmed-up engines, the engine is always near the operating point of minimum fuel consumption or the highest efficiency.

SUMMARY OF THE INVENTION

The object of the present invention is to influence the operator to follow an optimum mode of operation during vehicle acceleration to attain fuel economy.

Another object of the invention is to permit the operator to override this influence so as to not suppress the operator's will to overtake and pass other vehicles safely.

The foregoing objectives are achieved in the present invention by providing an accelerator pedal that cooperates with an adjustable limit stop to restrain the accelerator pedal in the direction of increasing fuel to the engine. The adjustable stop is preferably in the form of a wedge-shaped member to which a pneumatic actuator piston is connected to displace the stop relative to the accelerator pedal. The actuator piston is controlled via a regulating valve in the form of an electric-to-pneumatic transducer to which a control signal is connected in accordance with different engine operating conditions.

A limit spring is carried by the accelerator pedal in a caged condition, so as to engage the wedge-shaped stop when the optimum accelerator position is reached. When this occurs, the accelerator movement is restrained by the limit spring to provide the operator with an indication of the desired accelerator setting. As the engine operating conditions change, the position of the wedge-shaped stop accordingly changes to continuously vary this desired accelerator setting. The operator is always free to override the desired accelerator setting by applying sufficient pedal force to overcome the tension of the limit spring in order to increase the accelerator setting to a position beyond the position where maximum fuel economy is realized. This gives the operator the flexibility to overtake and pass other vehicles safely, notwithstanding the fact that the optimum accelerator position is continuously indicated.

BRIEF DESCRIPTION OF THE DRAWING

Other objects and attendant advantages of the present invention will become apparent from the following more detailed explanation when taken with the single FIGURE drawing showing schematically a preferred embodiment of an accelerator control mechanism comprising the present invention.

DESCRIPTION OF THE PREFERRED EMBODIMENT

Installed on the underside of an otherwise conventional accelerator pedal 1 is a hairpin-shaped limit spring 2, one leg of which bears against the underside of pedal 1 and the other leg of which is supported by a spring cage 5 that is carried by pedal 1 to maintain the spring under tension. Pedal 1 is free to move about its pivot in the usual manner without limit spring 2 exerting any influence whatsoever on the pedal until sufficient depression of the pedal causes end 11 of the other spring leg to engage a wedge-shaped stop 3. When this occurs, the operator encounters additional resistance to the accelerator corresponding to the tension of limit spring 2, due to the other spring leg being displaced from its engagement with spring cage 5. The spring resistance may be overcome, however, by further depressing the accelerator pedal 1 with a force sufficient to bend and thus compress the legs of spring 2.

An actuator device is provided comprising a piston 4 that is connected to stop 3 and a slideway 6 along which the wedge-shaped stop 3 may be shifted horizontally in either a leftward or rightward direction to thereby change or adjust the point at which increased pedal resistance is encountered. Piston 4 is subject on one side to a return spring 7 and on the other side to compressed air supplied from a storage reservoir 10 via a regulating valve 8, in order to control the horizontal position of stop 3 and thus the point of restraint of accelerator pedal 1.

Regulating valve 8 may be an electric-to-pneumatic transducer that receives a control signal from an electronic control circuit 9. A speed detector 12 senses engine speed as the primary variable by which regulating valve 8 is adjusted to set the position of stop 3 and thus establish the accelerator pedal setting at which optimum fuel economy is realized. Additional information is supplied to control circuit 9 representing the engine characteristic, i.e., the type of motor, since the minimum allowable speeds of various motors differ. Furthermore, information corresponding to the motor temperature is supplied to control circuit 9, in order to not overload an engine that has not yet reached its normal operating temperature.

Control circuit 9 is programmed in such a way that the accelerator restraining point, i.e., the point at which the accelerator pedal 1 engages wedge-shaped stop 3, is located at the point where optimum motor efficiency occurs. During acceleration, for example, the wedge-shaped stop is shifted to its leftward-most position, so that the accelerator pedal 1 will encounter the resistance of spring 2 during initial depression of the pedal. As the engine speed increases, the wedge-shaped stop is shifted rightwardly, thus changing the restraining point of the accelerator pedal to indicate that further depression of the pedal is in order. In this manner, the operator is continuously apprised of the appropriate degree of accelerator depression for the instant operating condition of the vehicle engine in order to attain optimum engine operating efficiency.

Spring 2 permits the operator to override this restraint by simply applying sufficient pedal force to overcome the spring tension and compress the legs of the hairpin-shaped spring 2, in order to permit maximum depression of the accelerator pedal at any time. This allows the operator to achieve a high rate of acceleration in order to overtake and pass other vehicles safely.

According to a further aspect of the invention, the accelerator pedal 1 is employed to signal the vehicle operator to shift gears. To this end, control circuit 9 may be programmed to cause wedge-shaped stop 3 to shift slightly in a leftward direction from its pedal restraining position, thereby increasing the degree of compression and thus the tension of spring 2. This increased spring tension is sensed by the operator through the accelerator pedal, as a signal to up-shift. The same effect can be achieved through a brief impulse, i.e., a back-and-forth shifting of wedge-shaped stop 3 under control of control circuit 9. In each case, expeditious shifting can be accomplished without distracting the attention of the operator from traffic conditions.

It is also possible to set the accelerator pedal restraining point through means other than spring 2, for example, magnetically.

The invention, as described in the foregoing, is particularly useful on commercial-type vehicles which, compared to passenger cars, are under-powered and have more gears. Consequently, the acceleration phase lasts for a considerably longer period of time, making possible conservation of an especially large amount of fuel.

Having now described the invention what I claim as new and desire to secure by Letters Patent, is:

1. An accelerator control mechanism for a motor vehicle comprising:
   (a) an operator's accelerator pedal movable within a range extending between a fully retracted position and a depressed position to regulate the supply of fuel to the vehicle engine;
   (b) a positionable stop with which said pedal is engageable during acceleration for restraining movement of said pedal toward said depressed position, whereby a desired pedal position is established in which optimum fuel economy is attained;
   (c) a spring cage fixed to said pedal;
   (d) a limit spring supported between said spring cage and said pedal, said limit spring being engageable with said stop to provide said restraining of said pedal in said desired pedal position, and upon said engagement with said stop being compressible to permit further movement of said pedal beyond said desired pedal position toward said depressed position; and
   (e) means for controlling the position of said stop in accordance with different speeds of the vehicle engine.

2. An accelerator control mechanism, as recited in claim 1, wherein said positionable stop comprises a wedge-shaped stop.

3. An accelerator control mechanism, as recited in claim 1, wherein said controlling means comprises a piston subject to a spring on one side and fluid under pressure on the opposite side, said piston being connected to said stop.

4. An accelerator control mechanism, as recited in claim 3, wherein said controlling means further comprises:
   (a) engine speed sensing means for providing an output signal in accordance with the speed of said engine; and
   (b) regulating means operative in accordance with said output signal for controlling the fluid under pressure on said opposite side of said piston.

5. An accelerator control mechanism, as recited in claim 4, wherein said output signal is electrical, said regulating means being an electric-to-fluid pressure transducer subject to said electrical output signal to connect a source of fluid under pressure to said opposite side of said piston.

6. An accelerator control mechanism, as recited in claim 4, wherein said controlling means further comprises means for sensing engine temperature, and engine type to further modify said output signal.

* * * * *